United States Patent [19]

Bova et al.

[11] Patent Number: 4,699,750
[45] Date of Patent: Oct. 13, 1987

[54] APPARATUS FOR STORAGE, RETRIEVAL AND DEPLOYMENT OF DRAG GAGES USED IN FUEL ASSEMBLY INSPECTION

[75] Inventors: Ignatius N. Bova, Pittsburgh; Ralph W. Kalkbrenner, Hempfield Township, Westmoreland County; Hans E. Leumann, Washington, all of Pa.

[73] Assignee: Westinghouse Electric Corp., Pittsburgh, Pa.

[21] Appl. No.: 832,951

[22] Filed: Feb. 26, 1986

[51] Int. Cl.[4] ............................................. G21C 17/00
[52] U.S. Cl. .................................. 376/245; 376/260; 376/258; 376/268; 294/906
[58] Field of Search .............. 376/260, 245, 240, 261, 376/262, 264, 268, 271, 258; 414/146; 294/906

[56] References Cited

U.S. PATENT DOCUMENTS

| | | | |
|---|---|---|---|
| 3,652,394 | 3/1972 | Braun | 376/327 |
| 3,938,845 | 2/1976 | Fehl et al. | 376/262 |
| 4,139,778 | 2/1979 | Raymond | 376/272 |
| 4,149,087 | 4/1979 | Artemiev et al. | 376/272 |
| 4,311,557 | 1/1982 | Kowalski et al. | 376/271 |
| 4,390,496 | 6/1983 | Wozniak | 376/245 |
| 4,425,296 | 1/1984 | Adamowski et al. | 376/245 |
| 4,481,164 | 11/1984 | Bollinger | 376/260 |
| 4,482,520 | 11/1984 | Randazza | 376/261 |
| 4,487,741 | 12/1984 | Vuckovich et al. | 376/271 |
| 4,585,612 | 4/1986 | Coussau et al. | 376/260 |
| 4,597,294 | 7/1986 | Brill, III et al. | 376/260 |

FOREIGN PATENT DOCUMENTS

| | | |
|---|---|---|
| 2657625 | 6/1978 | Fed. Rep. of Germany ...... 376/260 |
| 2915729 | 11/1979 | Fed. Rep. of Germany ...... 376/245 |
| 3247544 | 7/1983 | Fed. Rep. of Germany ...... 376/434 |
| 0067496 | 4/1984 | Japan ................................. 376/245 |

Primary Examiner—Deborah L. Kyle
Assistant Examiner—Daniel Wasil

[57] ABSTRACT

In a system for inspecting fuel assembly guide thimbles, an apparatus for handling drag gages insertable within the guide thimbles includes a spider rotatably mounted to an upright support structure and supporting drag gages in a series of angularly-displaced storage positions about the support structure, and a drive operable to rotate the spider relative to the support structure and thereby moving the gages about an endless path to dispose a selected one thereof at a retrieval-and-return station. An elongated track mounted to the support structure extends outwardly above the spider, and a trolley is movable along the track between a remote position overlying a work station containing the fuel assembly to be inspected and a position adjacent to the support structure and overlying the drag gage retrieval-and-return station. A gripper mechanism, supported by a hoist which in turn is supported by the trolley, is operable for respectively gripping and releasing the selected one gage at the retrieval-and-return station. The hoist is operable to raise and lower the gripper mechanism and selected gage therewith away from and toward the retrievel-and-return station when the trolley is positioned adjacent the support structure and to raise and lower the gripper mechanism and gage therewith away from and toward the fuel assembly guide thimbles when the trolley is at the remote position. Also, a safety sleeve is normally disposed about the gripper mechanism for restraining it in a gripping relation with the drag gage.

12 Claims, 11 Drawing Figures

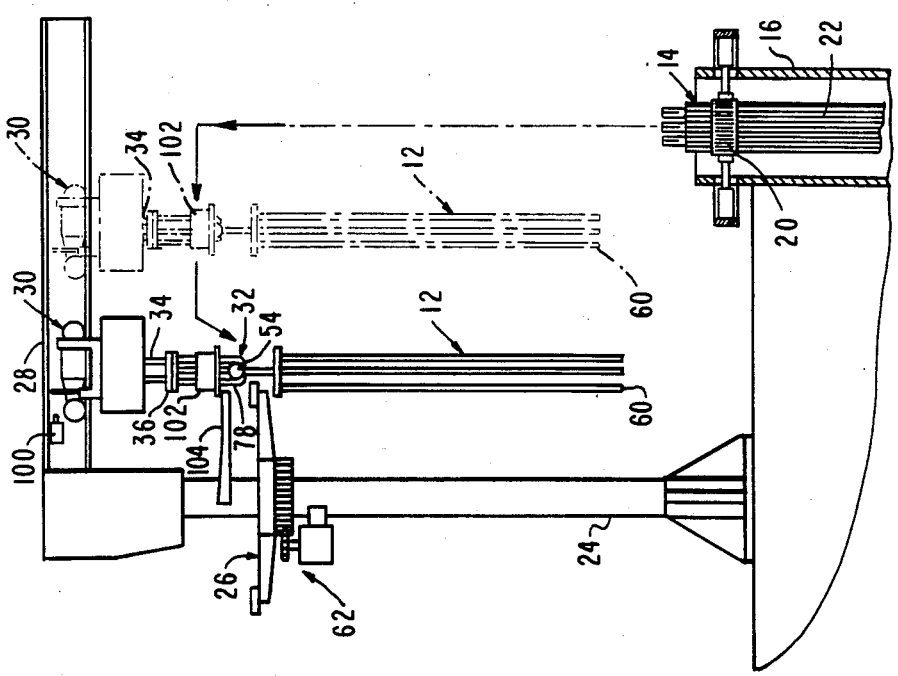
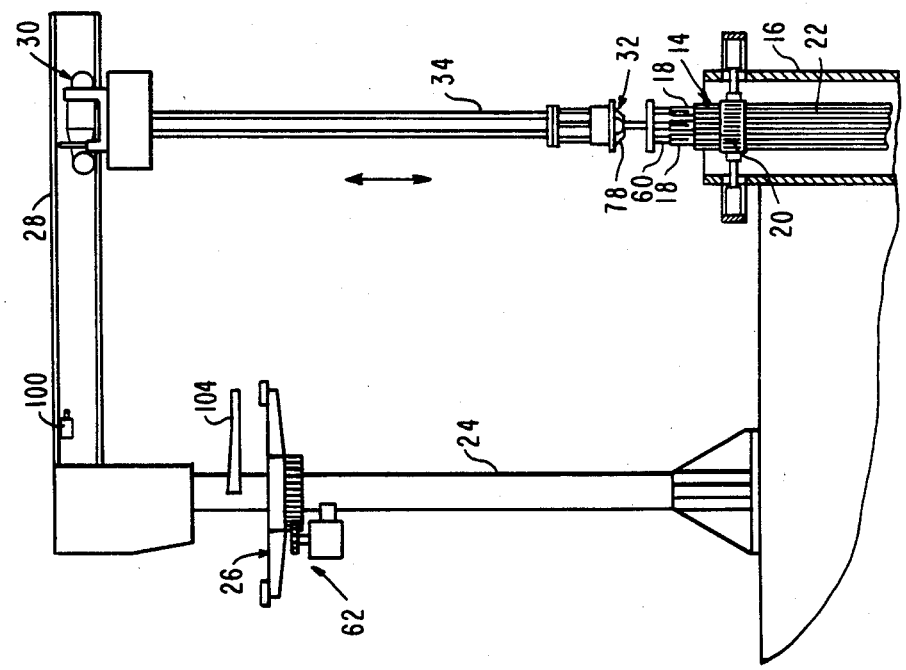

APPARATUS FOR STORAGE, RETRIEVAL AND DEPLOYMENT OF DRAG GAGES USED IN FUEL ASSEMBLY INSPECTION

BACKGROUND OF THE INVENTION

1. Field of the Invention

The present invention relates generally to fuel assemblies for nuclear reactors and, more particularly, is concerned with an apparatus for storage, retrieval and deployment of vertically suspended drag gages used in a semi-automated system for inspecting a fuel assembly for potential control rod guide thimble misalignment.

2. Description of the Prior Art

In a typical nuclear reactor, the reactor core includes a large number of fuel assemblies each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of the fuel assembly, also provide channels or guides for insertion of the neutron absorber control rods within the reactor core. The level of neutron flux and thus the heat output of the core is normally regulated by the movement of the control rods into and from the guide thimbles.

In addition to accommodating normal stepped insertion of the control rods, the guide thimbles must allow their rapid insertion should a reactor trip arise. Therefore, one procedure typically carried out to determine the quality of a fuel assembly is an inspection for potential control rod hang up or malfunction by performance of a drag check utilizing tooling rods. The slender tooling rods, referred to collectively as a drag gage, are lowered into the hollow control rod guide thimbles in a vertical attitude. The descending gage must not encounter a drag which results in a weight reduction of fifteen pounds or more to qualify the fuel assembly as acceptable.

Heretofore, this inspection task has required use of the main bridge crane and three persons to carry it out. Particularly, in addition to a person to operate the inspection equipment, the inspection procedure has utilized the main bridge crane with the assistance of a crane operator and a hook-up man stationed on an elevating lift platform. Thus, the current inspection task is labor intensive and occupies the crane for prolonged periods of time. Consequently, a need has emerged to improve and automate the manner in which the inspection is carried out.

SUMMARY OF THE INVENTION

The present invention provides an apparatus designed to satisfy the aforementioned needs by facilitating automated storage, retrieval and deployment of the vertically suspended drag gages used in inspection of the fuel assembly guide thimbles. The general virtues of the apparatus include the modernization of the current drag check facility to achieve productivity and quality gains by the mechanization and automation of most test procedures. Specifically, the employment of a dedicated system eliminates the necessity to use the main bridge crane and thus the requirement for the services of a craneman and hook-up man. Other benefits derived are reduced cycle time, improved safety of personnel and product, and automated sensing of a specified drag effect.

The apparatus employs a gripper mechanism on overhead handling and lifting equipment which has associated with it a cylindrical safety device which prevents inadvertent release of the gripper mechanism. The safety device being, passive and automatic in function, does not complicate the normal operation of the gripper mechanism.

The apparatus also incorporates an indexable dispenser for the drag gages of the system. Uniquely, the dispenser is mounted in an unorthodox place, such being about the vertical support column of the overhead handling and lifting equipment. Orthodox practice would dictate that a more complicated and costly stand-alone mounting structure be provided to store the drag gages. Thus, the apparatus of the present invention advantageously utilizes space efficiently by incorporating the dispenser about the support column, such as the column of a Jib crane, is less costly than a stand-alone structure, simplifies operation of the apparatus by limiting the distance that must be traveled to retrieve and return the gage, and enhances safety by reducing the area vulnerable to handling/transport problems.

Accordingly, the present invention is set forth in a system for inspecting fuel assembly guide thimbles and is directed to an apparatus for handling at least one drag gage being insertable within the guide thimbles. The apparatus comprises: (a) storing means for holding at least one drag gage in a storage position; (b) indexing means for moving the drag gage along a path to dispose the gage at a retrieval-and-return station; (c) loading means operable for respectively gripping and releasing the gage at the retrieval-and-return station; (d) transporting means movable between a work station and a storage station; and (e) hoisting means supporting the loading means and being supported by the transporting means. The hoisting means is operable for respectively raising ad lowering the loading means and the drag gage therewith away from and toward the retrieval-and-return station when the transporting means is at the storage station and operable for respectively raising and lowering the loading means and the gage therewith away from and toward the fuel assembly guide thimbles when the transporting means is at the work station.

More particularly, the storing means holds a plurality of drag gages in a series of positions being angularly displaced for one another about a common axis. The indexing means is operable to move the drag gages about an endless path to dispose a selected one of the gages at the retrieval-and-return station.

Also, the present invention provides safety means for restraining the loading means in gripping relation with the drag gage. In addition, means is provided for releasing the safety means from restraining the loading means in gripping relation with the drag gage only when disposed at the retrieval-and-return station.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIGS. 8 to 11 are schematical representations of the sequence of steps carried out using the apparatus of the present invention in inspecting the guide thimbles of a fuel assembly.

DETAILED DESCRIPTION OF THE INVENTION

Figure 1:
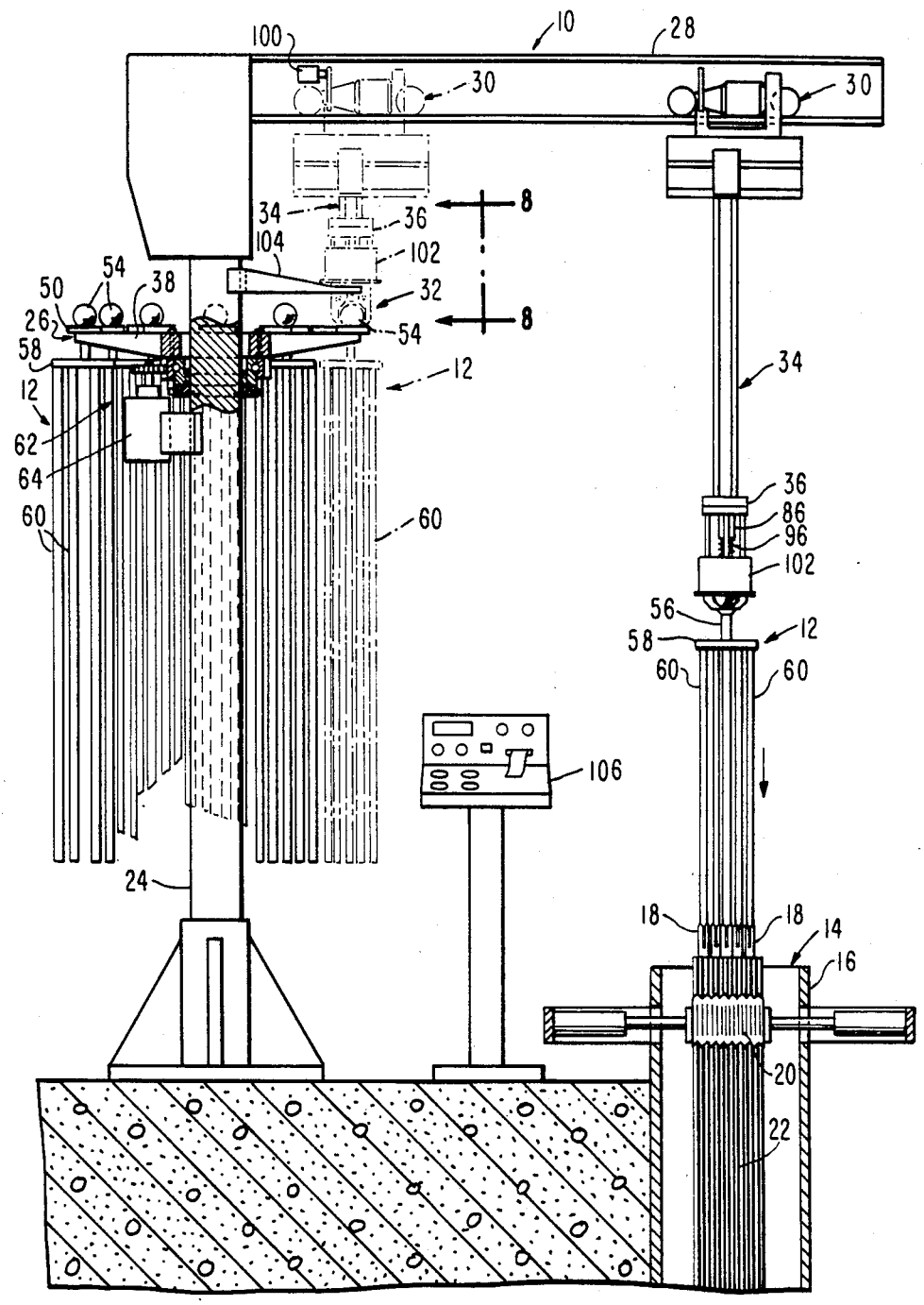
FIG. 1 is an elevational view of the apparatus of the present invention for storing, retrieving and deploying drag gages being used in inspecting the guide thimbles of a nuclear fuel assembly.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Referring now to the drawings, and particularly to FIG. 1, there is shown an apparatus, generally designated by the numeral 10 and comprising the preferred embodiment of the present invention, for storing, retrieving and deploying vertically suspended drag gages 12 used in inspecting a nuclear fuel assembly 14 while supported at a work station 16 with its top nozzle removed.

The fuel assembly 14 basically includes a lower end structure or bottom nozzle (not shown) and a number of longitudinally extending hollow guide tubes or thimbles 18 which project upwardly from the bottom nozzle. The assembly 14 further includes a plurality of transverse grids 20 (only one being shown) axially spaced along the guide thimbles 18 and an organized array of elongated fuel rods 22 transversely spaced and supported by the grids 20. Also, the assembly 14 has an upper end structure or top nozzle (not shown) which is normally attached to the upper ends of the guide thimbles 18. With such an arrangement of parts, the fuel assembly 14 forms an integral unit capable of being conventionally handled without damaging the assembly parts.

As mentioned above, the fuel rods 22 in the array thereof in the assembly 14 are held in closely spaced relationship with one another by the grids 20 spaced along the fuel assembly length. Each fuel rod 22 contains nuclear fuel pellets composed of fissile material responsible for creating the reactive power of the reactor within which the fuel assembly is employed. A liquid moderator/coolant such as water, or water containing boron, is pumped upwardly through the guide thimbles 18 and along the fuel rods 22 of the fuel assembly 14 in order to extract heat generated therein for the production of useful work.

The hollow guide thimbles 18, in addition to being structural elements of the fuel assembly 14, also provide channels or guides for insertion of control rods (not shown) into the reactor core in controlling its level of reactive power. For proper movement of the control rods into and from the guide thimbles 18, the latter must be free of obstructions.

The present invention provides the improved, mechanized and semi-automated apparatus 10 for handling the drag gages 12 used in inspecting the guide thimbles 18 of the fuel assembly 14. The objective is to discover obstructions or misalignment in the guide thimbles 18 which have the potential to cause control rod hang up or malfunction by improved performance of a drag check utilizing one of the drag gages 12. Basically, the drag gage handling apparatus 10 includes an upright support column 24, such as a crane post, rotatably mounting a spider 26 which supports a plurality of the drag gages 12 (for instance, twelve in number) and having an elongated track 28 mounted thereto which extends outwardly therefrom above the spider. A trolley 30 is movable along the track 28 between one position (FIGS. 1 and 10) located remote from the support column 24 and aligned in overlying relation to the work station 16 and a fuel assembly 14 being held therein and another position (FIGS. 8, 9 and 11) located adjacent to the support column 24 and aligned in overlying relation to a retrieval-and-return station of the spider 26.

In addition, the handling apparatus 10 includes a gripper mechanism 32 operable for respectively gripping and releasing the one drag gage 12 disposed by the spider 26 at its retrieval-and-return station, and a hoist 34 supporting the gripper mechanism 32 and, in turn, being supported by the trolley 30. A conventional load cell 36 (FIGS. 4 and 5) is interfaced between the gripper mechanism 32 and the hoist 34 for measuring the weight of the drag gage 12 as it is being inserted (FIGS. 1 and 10) within the fuel assembly guide thimbles 18. The hoist 34 is generally operable for respectively raising and lowering the gripper mechanism 32 and the one drag gage 12 therewith away from and toward the retrieval-and-return station when the trolley 30 is at the position adjacent the support column 24 and operable for again respectively raising and lowering the gripper mechanism 32 and the drag gage 12 therewith away from and toward the fuel assembly guide thimbles 18 when the trolley 30 is at the remote position.

Figure 2:
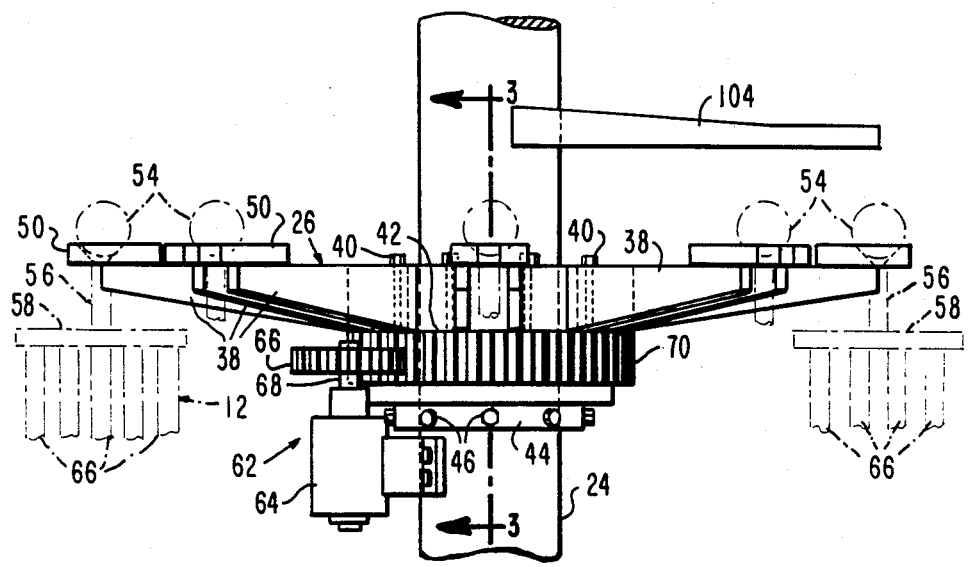
FIG. 2 is an enlarged fragmentary elevational view of the apparatus of FIG. 1, showing a multi-position indexable drag gage storage dispenser of the apparatus.
Figure 3:
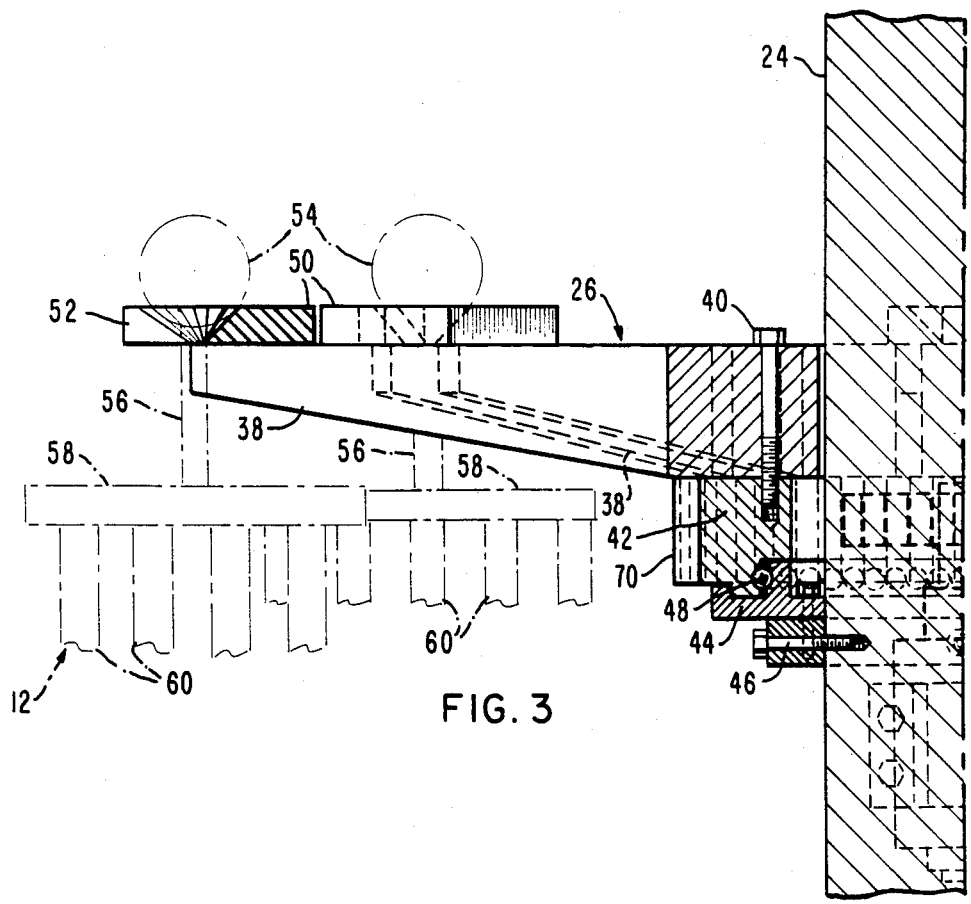
FIG. 3 is an enlarged sectional view of the indexable storage dispenser as taken along line 3—3 of FIG. 2.

More particularly, as seen in FIGS. 1 to 3, the spider 26 includes a plurality of arms 38 mounted by a corresponding plurality of fasteners 40 on a ring member or hub 42 which is fitted about the support column 24 and seated on an annular bracket 44 attached to the column 24 by fasteners 46. Bearings 48 disposed between the spider hub 42 and the bracket 44 allow rotation of the spider 26 about a vertically extending central axis of the column 24. The spider arms 38 are attached on the hub 42 so as to extend radially outward from the column axis. Each of the spider arms 38 has a cradle 50 attached to an outer end thereof with an outwardly opening slot 52 defined therein for receiving and supporting one of the drag gages 12. Each of the drag gages 12 has an upper spherical ball 54 with an elongated slender neck portion 56 attached to a plate 58 and adapted to fit through the cradle slot 52 so as to seat the ball 54 on the cradle with a plurality of insertion rods 60 of the drag gage 12 mounted at their upper ends to the plate 58 extending downwardly below the cradle. In such manner, the spider 26 supports the drag gages 12 in a series of positions being angularly displaced from one another about the common central axis of the support column 24.

Additionally, suitable drive means, generally designated 62, is provided for rotating the spider 26 relative to the support column 24 so as to move the drag gages 12 supported on the cradles 50 of the spider arms 38 along an endless circular path to dispose a selected one of the gages 12 at the retrieval-and-return station. The drive means 62 includes a motor 64 attached on the support column 24 adjacent the spider 26 and having a drive gear 66 on the end of its output drive shaft 68 which intermeshes with a driven gear 70 defined on the spider hub 42 for transmitting rotary indexing motion thereto for driving the spider.

Turning next to FIGS. 4 to 7, there is illustrated in detail the gripper mechanism 32 which provides a drag gage loading means actuatable between a contracted position (FIGS. 4 and 6) and an expanded position (FIGS. 5 and 7) for respectively gripping and releasing the selected one of the drag gages 12. The gripper mechanism 32 includes a triangular-shaped mounting plate 72 being suspended at its corners by attachment rods 74 from the load cell 36 and having pivot yokes 76 extending from the sides of the plate between its corners. A set of gripping fingers 78 corresponding in number to the pivot yokes 76 are mounted therebetween by pins 80 for pivotal movement radially relative to a common axis of the gripper mechanism 32. Each of the gripping fingers 78 has a lower inwardly and downwardly inclined tip 82 and a bifurcated upper end 84.

Figure 4:
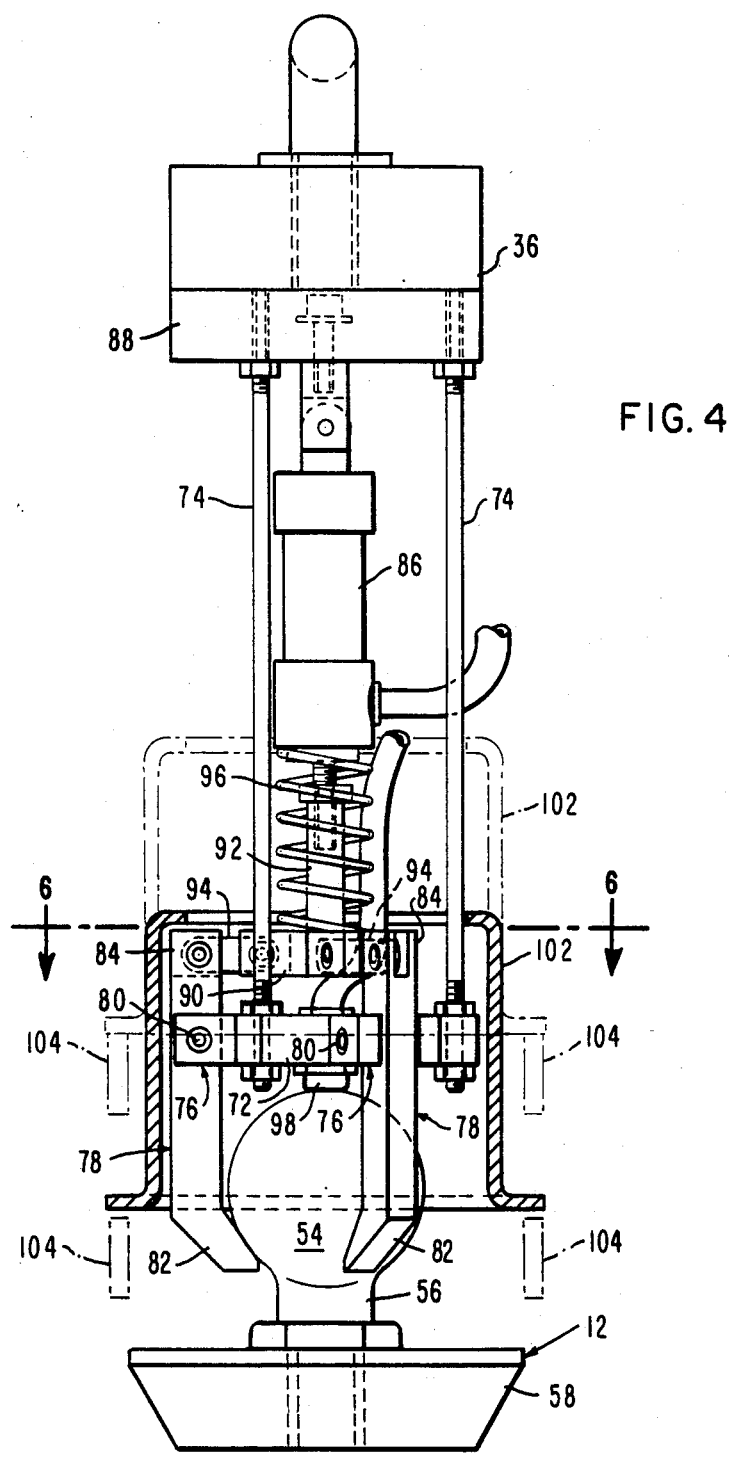
FIG. 4 is an enlarged fragmentary elevational view of the apparatus of FIG. 1, showing a gripper mechanism of the apparatus and a cylindrical safety device thereof disposed in a locking position on the gripper mechanism, passively restraining its gripping fingers in a load lifting mode.
Figure 5:
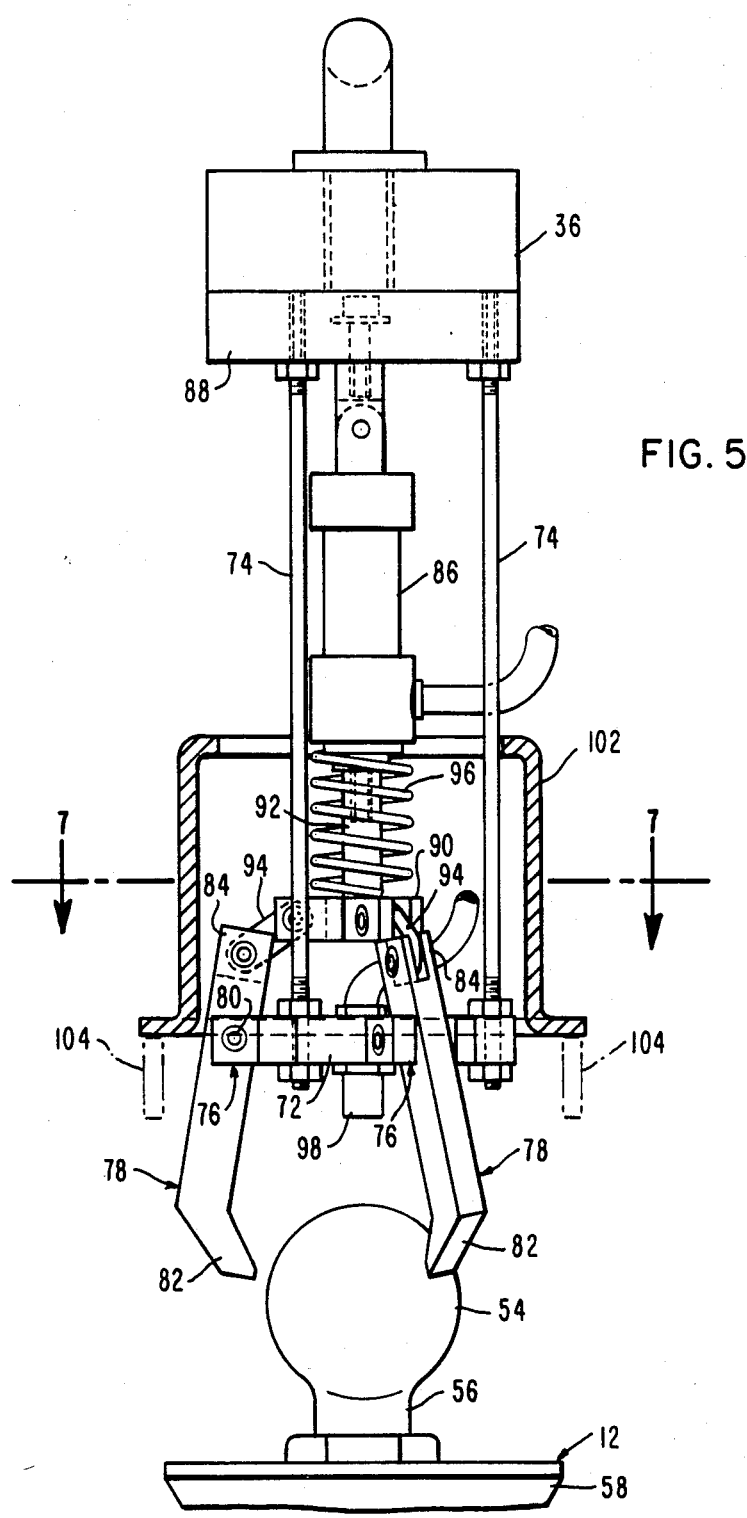
FIG. 5 is a view similar to FIG. 4, but showing the safety device disposed in an unlocking position relative to the gripper mechanism, allowing actuation of its gripping fingers to a load releasing mode.
Figure 6:
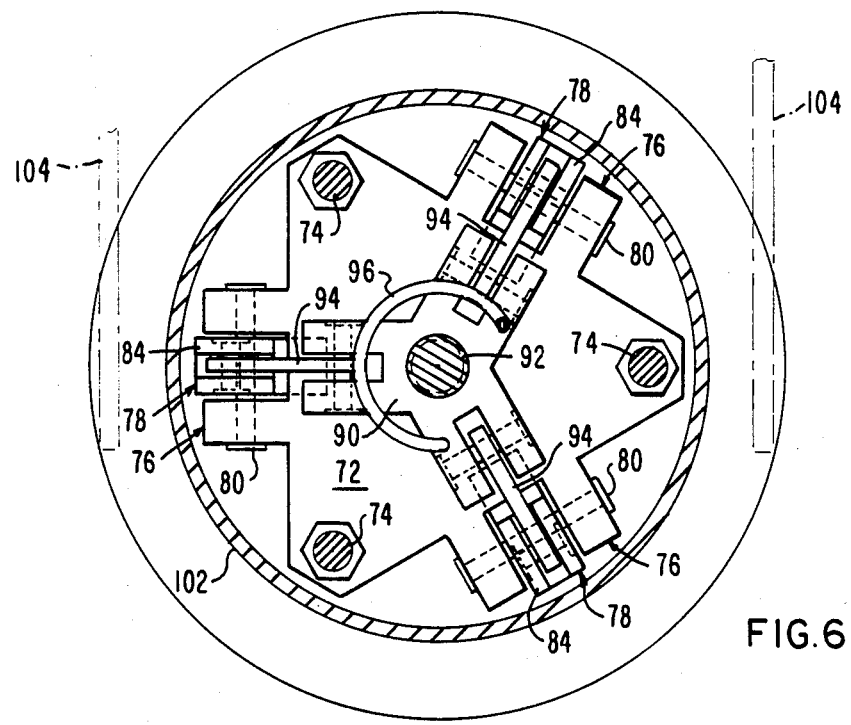
FIG. 6 is an enlarged sectional view of the gripper mechanism as taken along line 6—6 of FIG. 4.
Figure 7:
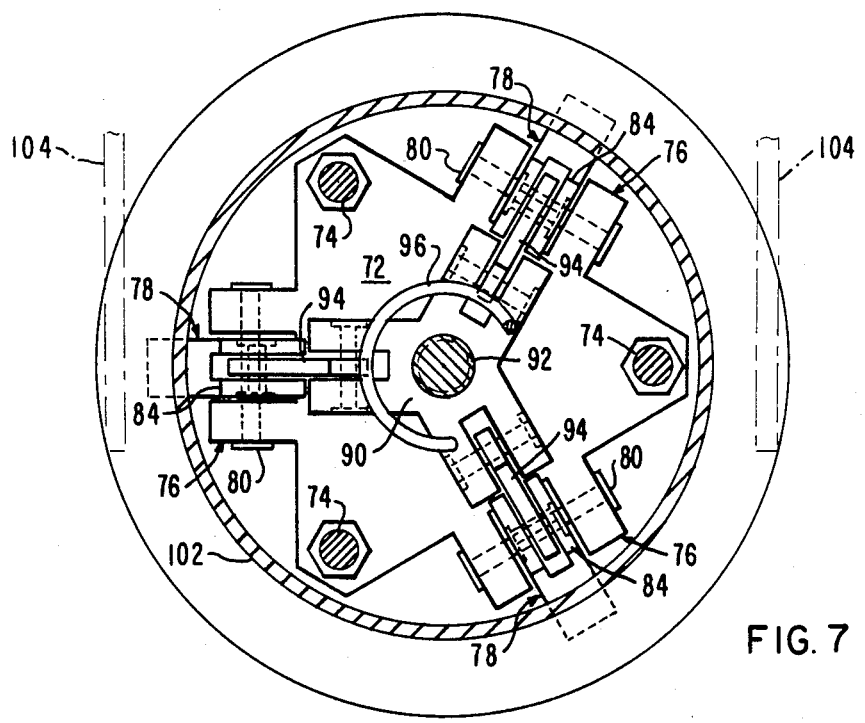
FIG. 7 is a view similar to FIG. 6, but taken along line 7—7 of FIG. 5.

The gripper mechanism 32 also includes means for moving the set of gripping fingers 78 between an inwardly-displaced contracted position, as seen in FIG. 4, wherein the lower tips 82 of the fingers 78 extend under the ball 54 on the drag gage 12 for gripping the same and an outwardly-displaced expanded position, as seen in FIG. 5, wherein the lower tips 82 of the fingers 78 are retracted away from under the ball 54 for releasing the same. The means operable to move the fingers 78 between the respective positions includes an actuator 86, such as an air cylinder, being anchored to a bottom plate 88 of the structure containing the load cell 36 and mounting a Y-shaped connector 90 at its piston rod 92 which is interconnected by links 94 to the upper bifurcated ends 84 of the respective fingers. A compressed spring 96 is captured between the lower end of the actuator 86 and the connector 90 for normally biasing the set of fingers 78 to the contracted gripping position of FIG. 4. However, when the piston rod 92 of the actuator 86 is retracted, as seen in FIG. 5, the set of fingers 78 move to the expanded releasing position. A conventional proximity sensor 98 is attached below the center of the mounting plate 72 for sensing when the fingers 78 are disposed close enough to the ball 54 of the drag gage 12 to accomplish gripping thereof by the fingers 78. Thus, the proximity sensor 98 helps to determine when the fingers 78 are ready to be pivoted by deactuation of the actuator 86 into releasing relation with the ball 54. Whenever the actuator 86 is deactuated, the compressed spring 96 will return the fingers 78 to their contracted gripping position, thereby creating a "fail safe" configuration.

Figure 9:
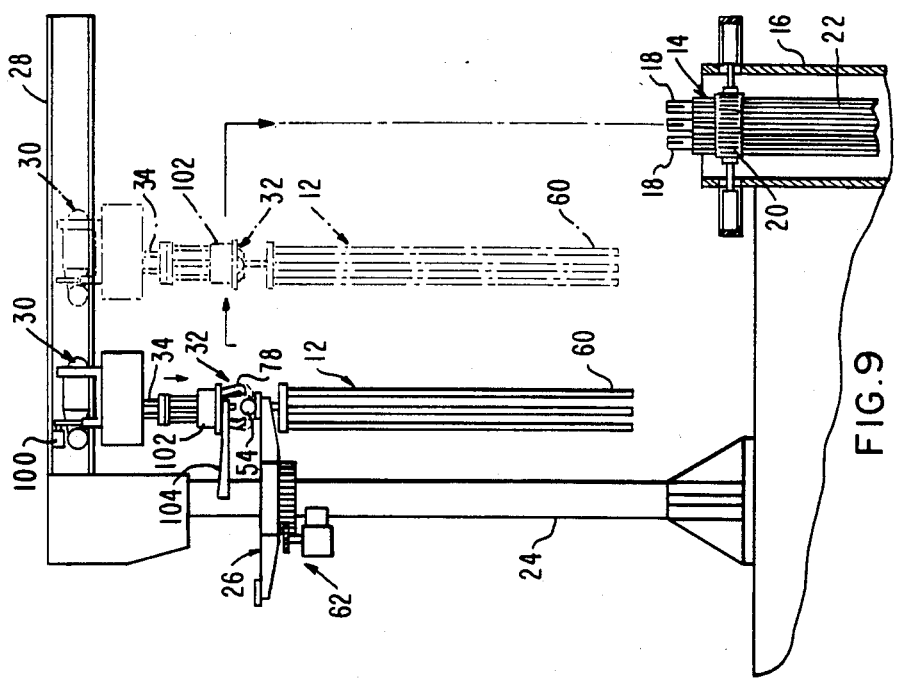

Means are provided to ensure that the drag gage 12 being lifted and deployed by the handling apparatus 10 is not prematurely or inadvertently released and dropped as it is being transported between the retrieval-and-return station and the work station 16. Particularly, a limit switch 100 disposed along the track 28 adjacent the support column 24 ensures that the actuator 86 can only pivot the fingers 78 to the expanded position when the trolley 30 is engaged with the switch 100 and overlies the retrieval-and-return station, as seen in FIGS. 8 and 9.

In addition, passive safety means in the form of a cylindrical sleeve 102 restrains the fingers 78 of the gripper mechanism 32 at the contracted position in gripping relation with the drag gage ball 54. The sleeve 102, aided by the force of gravity, is normally seated about the gripper mechanism fingers 78 in the position seen in FIG. 4. The sleeve 102, free to slide vertically, is lifted to its phantom line position of FIG. 4 and solid line position of FIG. 5, only when the gripper mechanism 32 is disposed at the retrieval-and-return position of the spider 26 with the ball 54 of the drag gage 12 disposed above the one cradle 50. Such is accomplished by means in the form of a tapered arm structure 104 mounted in cantilevered fashion to the support column 24 above the one spider arm 38 and cradle 50 at the retrieval-and-return station. The arm structure 104 is precisely positioned relative to arrival of the gripper mechanism 32 at the retrieval-and-return station to engage and displace or lift the safety sleeve 102 from about the gripper mechanism so as to release the restraint on its fingers 78 as the gripper mechanism is lowered relative to the arm structure. The actuator 86 is now free to manipulate the fingers for facilitating respective fetching and storing of the drag gages 12.

FIGS. 8 to 11 illustrate the sequence of steps which take place in retrieving one of the drag gages 12 and transporting it to the work station 14 for performance of a drag check on the fuel assembly guide thimbles 18. Then, once the inspection is completed, the drag gage 12 is returned to storage on the spider.

Figure 8:
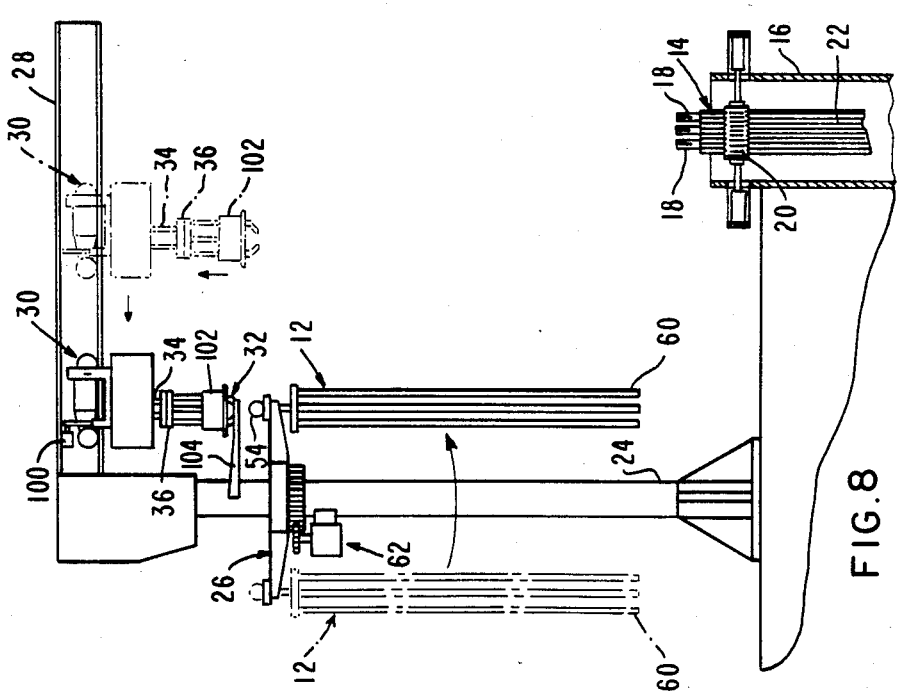

More particularly, in FIG. 8 the spider 26 is rotated to place the desired one of the drag gages 12 at the retrieval-and-return position thereon. With the trolley 30 at the loading position adjacent the support column 24 engaged with the limit switch 100 and the safety sleeve 102 lifted above the gripper mechanism 32, the actuator 86 is operated to expand the fingers 78 to allow placement about the ball 54 of the one drag gage 12. Then, when the proximity sensor 98 signals that the gripper mechanism 32 is down on the ball 54, the actuator 86 is operated to contract the fingers 78 and place them in gripping relation with the ball 54.

As the trolley 30 begins movement toward the work station 16, as seen in phantom line form in FIG. 9, the safety sleeve 102, once released from structure 104, descends over the gripper mechanism 32 and remains there until the gripper mechanism returns to the loading position at the retrieval-and-return station, as shown in FIG. 11.

At the work station seen in FIG. 10, the hoist 34 is operated to lower the drag gage 12 for insertion of its rods 60 into the guide thimbles 18 of the fuel assembly 14 to inspect for obstructions or misalignment therein. The drag gage rods 60 are lowered into the guide thimbles 18 after manual alignment and rotation by the operator. Descent of the drag gage to a predetermined depth constitutes the inspection. Upon reaching a load change of fifteen pounds on the load cell, an alarm prompts the operator to abort operation and a note is made of the approximate location of the obstruction. As seen in FIG. 11, after completion of the inspection, the drag gage 12 is withdrawn upward and the trolley operated to return the gage to the spider 26 through a series of steps substantially the reverse of the sequence used in fetching the gage.

The control system utilized is a programmable controller which is used in conjunction with manual controls on a hand held pendant and/or on a floor mounted console 106. The programmable controller processes the limit switch and sensor input signals and provides all of the automatic sequence of operations including timing, counting and logic functions. Indicator lights thereon will also prompt the operator to perform manual functions as required in the sequence of operations.

To summarize, the anticipated benefits of the present invention include improved quality, reliability and cycle time. The quality of the inspection is improved since the load cell is more accurate in determining the value and location of the obstruction causing a fifteen or more pounds weight loss during the test cycle descent of the gage. This state-of-the-art system should provide better base data and permit statistical record keeping. Reliability should improve due to the following factors: dedicated state-of-the-art equipment, modular component design, derated motorized system, use of proven mechanisms and subsystems, and minimal preventative maintenance needed to provide a long service life. Cycle time is shortened by eliminating the use of the main crane, its operator and the hook-up man. These contribute to both reduced elapsed time per inspection and reduced manpower needs.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a fuel assembly guide thimble inspecting system having a plurality of drag gages being insertable within guide thimbles of a fuel assembly, a drag gage handling apparatus comprising:
   (a) storing means for holding the plurality of drag gages in a series of storage positions being angularly displaced from one another about a common axis;
   (b) means for moving said drag gages from said respective storage positions about an endless path to dispose a selected one of said gages at a retrieval-and-return station;
   (c) loading means operable for respectively gripping and releasing said selected one drag gage at said retrieval-and-return station;
   (d) transporting means movable between a work station and a storage station;
   (e) hoisting means supporting said loading means and being supported by said transporting means, said hoisting means being operable for respectively raising and lowering said loading means and said selected one drag gage therewith away from and toward said retrieval-and-return station when said transporting means is at said storage station and operable for respectively raising and lowering said loading means and said selected one drag gage away from and toward the fuel assembly guide thimbles when said transporting means is at said work station;
   (f) safety means releasably mounted to said loading means for restraining said loading means in gripping relation with said selected one drag gage; and
   (g) means located adjacent to said retrieval-and-return station for releasing said safety means from restraining said loading means in gripping relation with said selected one drag gage only when said loading means and selected one drag gage are disposed at said retrieval-and-return station.

2. The handling apparatus as recited in claim 1, further comprising:
   a load cell interfaced between said loading means and said hoisting means for measuring the weight of said selected one drag gage as it is inserted within said fuel assembly guide thimbles.

3. In a fuel assembly guide thimble inspecting system having a plurality of drag gages being insertable within guide thimbles of a fuel assembly, a drag gage handling apparatus comprising:
   (a) an upright support structure;
   (b) a spider rotatably mounted to said support structure supporting the plurality of drag gages in a series of storage positions being angularly displaced from one another about said support structure;
   (c) drive means for rotating said spider relative to said support structure and thereby move said drag gages supported on said spider from said respective storage positions about an endless path to dispose a selected one of said gages at a retrieval-and-return station;
   (d) a gripper mechanism operable for respectively gripping and releasing said drag gage at said retrieval-and-return station;
   (e) an elongated track mounted to and extending outwardly from said support structure above said spider;
   (f) a trolley movable along said track between a position remote from said support structure and overlying a work station and a position adjacent to said support structure and overlying said retrieval-and-return station;
   (g) a hoist supporting said gripper mechanism and being supported by said trolley, said hoist being operable for respectively raising and lowering said gripper mechanism and said selected one drag gage therewith away from and toward said retrieval-and-return station when said trolley is at said position adjacent said support structure and operable for respectively raising and lowering said gripper mechanism and said selected one drag gage therewith away from and toward the fuel assembly guide thimbles when said trolley is at said remote position;

(h) a safety sleeve normally disposed about said gripper mechanism for restraining said gripper mechanism in gripping relation with said selected one drag gage; and (i) an arm structure mounted to said support structure so as to engage and displace said safety sleeve from about said gripper mechanism so as to permit release of said gripper mechanism from its gripping relation with said selected one drag gage when said gripper mechanism and said selected one drag gage are disposed at said retrieval-and-return station.

4. The handling apparatus as recited in claim 3, further comprising:
a load cell interfaced between said gripper mechanism and said hoist for measuring the weight of said selected one drag gage as it is inserted within said fuel assembly guide thimbles.

5. The handling apparatus as recited in claim 3, wherein said gripper mechanism includes:
a set of angularly displaced gripping fingers mounted for pivotal movement radially relative to a common axis between an inwardly-displaced contracted position for gripping said selected one drag gage and an outwardly-displaced expanded position for releasing said gage; and
means operable for moving said gripping fingers between said respective positions.

6. The handling apparatus as recited in claim 5, wherein said operable means includes:
an actuator being linked to said set of fingers such that when actuated said actuator causes the same to move to their contracted gripping position;
a sensor for sensing when said fingers are disposed adjacent said selected one drag gage for gripping the same; and
a resiliently yieldable member connected to said fingers for returning the same to their expanded releasing position whenever said actuator is deactuated.

7. In a fuel assembly guide thimble inspecting system having a plurality of drag gages being insertable within guide thimbles of a fuel assembly, a drag gage dispenser comprising:
(a) storing means for holding the plurality of drag gages in a series of storage positions being angularly displaced from one another about a common axis; and
(b) means for moving said drag gages from said respective storage positions about an endless path to dispose a selected one of said gages at a retrieval-and-return station;
(c) said storing means including a plurality of radially-projecting arms each having a cradle attached to an outer end thereof for receiving and supporting one of said drag gages.

8. In a fuel assembly guide thimble inspecting system having a plurality of drag gages being insertable within guide thimbles of a fuel assembly, a drag gage dispenser comprising:
(a) an upright support structure;

(b) a spider rotatably mounted to said support structure for supporting the plurality of drag gages in a series of storage positions being angularly displaced from one another about said support structure; and (c) drive means for rotating said spider relative to said support structure and thereby move said drag gages supported on said spider from said respective positions about an endless path to dispose a selected one of said gages at a retrieval-and-return station;

(d) said spider including a plurality of radially-projecting arms each having a cradle attached to an outer end thereof for receiving and supporting one of said drag gages.

9. The dispenser as recited in claim 8, wherein said drive means includes:
a motor mounted to said support structure adjacent to said spider for providing a source of rotary motion; and
interengaging means coupling said motor to said spider for transmitting rotary motion of said motor to said spider for rotatably driving the same relative to said support structure.

10. In a fuel assembly guide thimble inspecting system having a plurality of drag gages being insertable within guide thimbles of a fuel assembly, a safety mechanism comprising:
(a) a gripper mechanism actuatable between contracted and expanded positions for respectively gripping and releasing a selected one of said drag gages;
(b) safety means for restraining said gripper mechanism at its contracted position in gripping relation with said selected one drag gage; and
(c) means for releasing said safety means from restraining said gripper mechanism at said contracted position in gripping relation with said selected one drag gage only when disposed at a retrieval-and-return station for facilitating actuation of said gripper mechanism to said expanded position in releasing relation with said selected one gage and thereby facilitating respective fetching and storing thereof;
(d) said safety means being a safety sleeve normally disposed about said gripper mechanism for restraining said gripper mechanism in gripping relation with said selected one drag gage, said sleeve being displacable from about said gripper mechanism by said releasing means.

11. The safety mechanism as recited in claim 10, wherein said gripper mechanism includes:
a set of angularly displaced gripping fingers mounted for pivotal movement radially relative to a common axis between an inwardly-displaced contracted position for gripping said selected one drag gage and an outwardly-displaced expanded position for releasing said gage; and
means operable for moving said gripping fingers between said respective positions.

12. The safety mechanism as recited in claim 10, wherein said releasing means includes:
an upright support structure adjacent said retrieval-and-return stations; and
an arm structure mounted to said support structure so as to engage and displace said safety sleeve from about said gripper mechanism so as to permit release of said gripper mechansim from its gripping relation with said selected one drag gage when disposed at said retrieval-and-return station.

* * * * *